US007827082B1

(12) United States Patent
Shanmugam (10) Patent No.: US 7,827,082 B1
(45) Date of Patent: Nov. 2, 2010

(54) METHOD AND SYSTEM FOR MAPPING USER DATA

(75) Inventor: Elangovan Shanmugam, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 292 days.

(21) Appl. No.: 11/606,502

(22) Filed: Nov. 30, 2006

(51) Int. Cl.
*G06Q 40/00* (2006.01)
(52) U.S. Cl. .................................. 705/36 R; 705/35
(58) Field of Classification Search .............. 705/35–45
See application file for complete search history.

(56) References Cited

U.S. PATENT DOCUMENTS

| | | | | |
|---|---|---|---|---|
| 2001/0032155 | A1* | 10/2001 | Groat et al. .................. | 705/35 |
| 2005/0222929 | A1* | 10/2005 | Steier et al. .................. | 705/35 |
| 2006/0161485 | A1* | 7/2006 | Meldahl ...................... | 705/35 |

OTHER PUBLICATIONS

Jeff Maggioncalda; ( Sep. 2003). "10 questions with . . . Jeff Maggioncalda: Where are we with online financial advice? Journal of Financial Planning" 16(9), 12-16. Retrieved Jul. 16, 2010, from ABI/INFORM Global.*

Nalan Gulpinar, Berc Rustem, Reuben Settergren, Simulation and optimization approaches to scenario tree generation, Journal of Economic Dynamics and Control, vol. 28, Issue 7, Apr. 2004, pp. 1291-1315, ISSN 0165-1889, DOI: 10.1016/S0165-1889.*

* cited by examiner

*Primary Examiner*—Hani Kazimi
*Assistant Examiner*—Abshishek Vyas
(74) *Attorney, Agent, or Firm*—Osha • Liang LLP (57) ABSTRACT

A graphical user interface for displaying financial data that includes a root financial map that includes a root node, a contributor financial map graphically connected to the root node and that includes a least one contributor node, and an expenditure financial map graphically connected to the root node and that includes at least one expenditure node, wherein the root financial map conveys the financial data, wherein at least one selected from a group consisting of the contributor node and the expenditure node receives hypothetical data resulting from a user modifying the root financial map, and wherein the root financial map is updated based on the hypothetical data.

17 Claims, 8 Drawing Sheets

METHOD AND SYSTEM FOR MAPPING USER DATA

BACKGROUND

In a general sense, the concept of accounting is the systematic recording, maintaining, reporting, and analyzing of business transactions. The business transactions may or may not be monetary. For example, the business transactions may correspond to exchanging money for a good or a service, collecting raw goods, transforming the raw goods into a product, and selling the product, exchanging goods or services between entities, paying interest and principle on a loan, owning assets, etc. Accounting can allow individuals and business entities to use a historical record of the business transactions to predict and optimize future transactions.

Historically, accounting has been performed using a paper-based accounting journal. The advent of computers and the use of computer software for accounting functions has led to greater efficiency and understanding of financial data used for accounting. Specifically, computer software applications provide tools to efficiently calculate and analyze financial data. For example, an experienced, knowledgeable user of spreadsheet software may program the spreadsheet to perform a variety of statistical operations on the financial data and generate graphs in order to optimize future business transactions.

Financial software applications have further improved the efficiency in performing accounting actions. Specifically, financial applications assist a user in organizing, analyzing, and reporting financial data to evaluate a financial situation (past, present, and/or future). For example, financial applications may lead a user through a series of financial questions and provide help when a user has questions about entering financial data. After the user has submitted the financial data to the financial software application, the application may generate reports of the data for governing entities. The reports may assist the user to understand the financial data. Thus, financial applications simplify the task of accounting to aid in the understanding of financial data.

SUMMARY

In general, in one aspect, the invention relates to a graphical user interface for displaying financial data that includes a root financial map that includes a root node, a contributor financial map graphically connected to the root node and that includes a least one contributor node, and an expenditure financial map graphically connected to the root node and that includes at least one expenditure node, wherein the root financial map conveys the financial data, wherein at least one selected from a group consisting of the contributor node and the expenditure node receives hypothetical data resulting from a user modifying the root financial map, and wherein the root financial map is updated based on the hypothetical data.

In general, in one aspect, the invention relates to a method for displaying financial data that includes identifying a root node of financial data, displaying a root financial map for the root node, wherein the root financial map conveys the financial data, receiving a hypothetical outcome request by a user modifying the financial data on the root financial map, wherein the hypothetical outcome request comprises hypothetical data, updating the root financial map to reflect a hypothetical outcome resulting from the hypothetical data to generate an updated financial map, and displaying the updated financial map.

In general, in one aspect, the invention relates to a computer readable medium that includes computer readable program code embodied therein for causing a computer system to identify a root node of financial data, display a root financial map for the root node, wherein the root financial map conveys the financial data, receive a hypothetical outcome request by a user modifying the financial data on the root financial map, wherein the hypothetical outcome request comprises hypothetical data, update the root financial map to reflect a hypothetical outcome resulting from the hypothetical data to generate an updated financial map, and display the updated financial map.

In general, in one aspect, the invention relates to a system for displaying financial data that includes a map engine configured to identify a root node of financial data, generate a root financial map for the root node, wherein the root financial map conveys the financial data, and update a root financial map to reflect a hypothetical outcome resulting from hypothetical data to generate an updated financial map, a listener connected to the map engine and configured to receive a hypothetical outcome request by a user modifying the financial data on the root financial map, wherein the hypothetical outcome request comprises the hypothetical data, and a display device configured to display the root financial map, and display the updated financial map.

In general, in one aspect, the invention relates to a method for analyzing financial data that includes submitting a request identifying a root node, analyzing a root financial map, wherein the root financial map conveys the financial data, modifying financial data on the root financial map to generate hypothetical data, and analyzing an updated root financial map, wherein the updated root financial map conveys a hypothetical outcome resulting from the hypothetical data, and changing a financial practice according to the hypothetical outcome.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a graphical user interface and a method for performing financial related operations in accordance with one or more embodiments of the invention. Specifically, embodiments of the invention display a map of financial data. The map displays how each item of the financial data is related to other items of the financial data. Further, a user may modify the data in the map to display hypothetical results that may result from changing the data. Thus, the user may optimize future transactions by analyzing various hypothetical financial scenarios.

Figure 1:
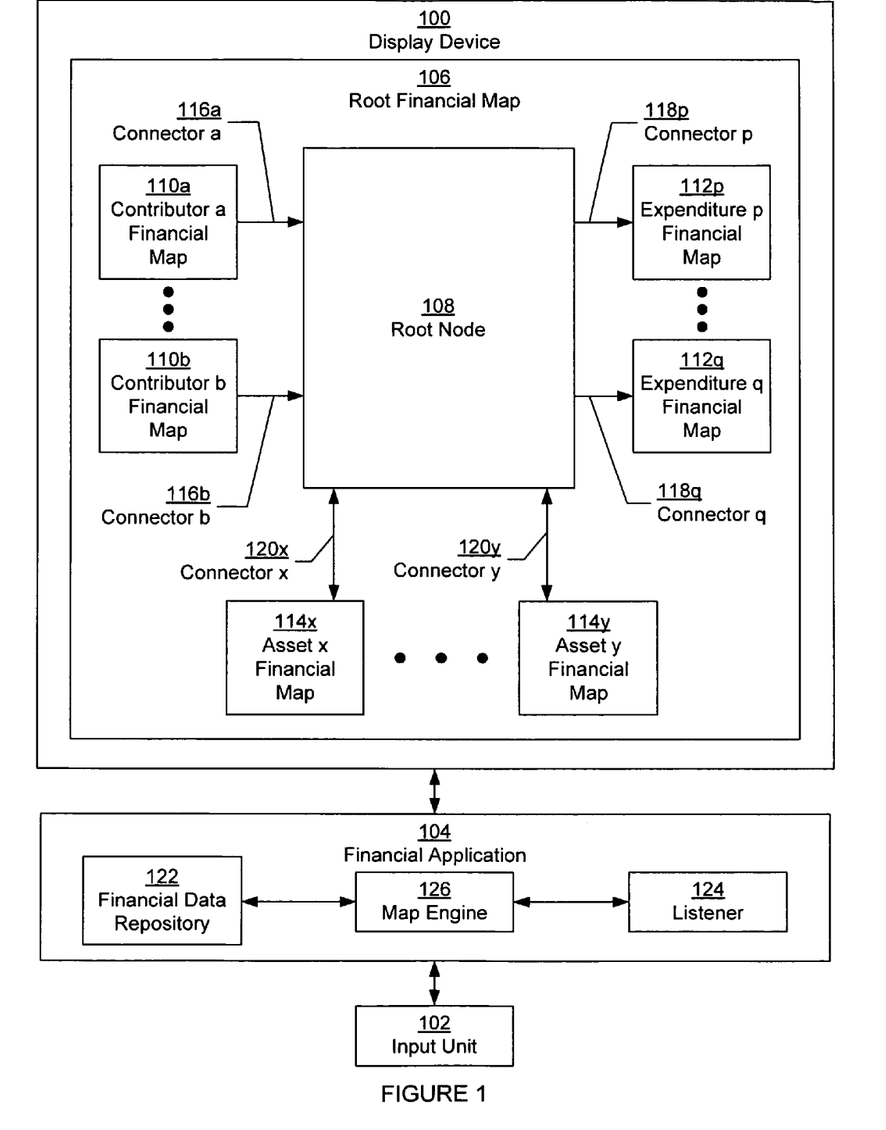
FIGS. 1-2 show schematic diagrams of a system for mapping user financial data in accordance with one or more embodiments of the invention.
Figure 2:
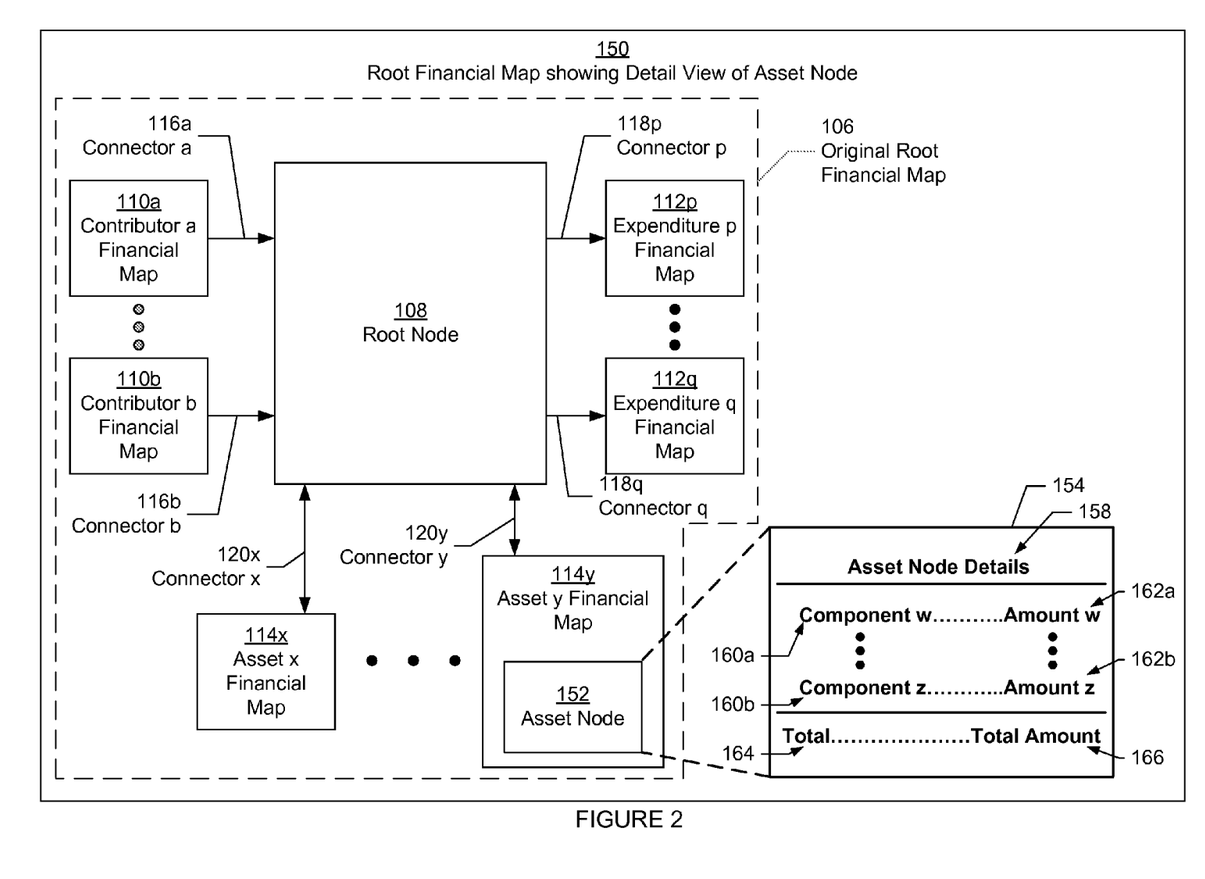

FIGS. 1-2 show schematic diagrams of a system for mapping user financial data in accordance with one or more embodiments of the invention. As shown in FIG. 1, the system includes a display device (100), an input unit (102), and a financial application (104). Each of the components is described below.

The display device (100) corresponds to any type of device that has a visual display. For example, the display device (100) may correspond to a screen (e.g., touch screen, liquid crystal display (LCD), plasma display, etc.) on a computing device (e.g., handheld device, computer, or any other type of device that receives instructions). The display device (100) includes functionality to display a root financial map (106).

In one or more embodiments of the invention, a root financial map (106) corresponds to a visual display that shows how financial data is interrelated through an interconnection of nodes. Specifically, the root financial map (106) is part of a graphical user interface to allow a user to interact and analyze financial data. The nodes in the root financial map (106) correspond to items in financial data. Items in financial data correspond to any piece of information available in the financial data. For example, an item may correspond to stocks the user has available, the amount stored in each of the user's financial accounts, where inventory is stored, etc. An item of the financial data may correspond to an aggregate item or an atomic item. An aggregate item has components corresponding to other items in the financial data. For example, an aggregate item corresponding to utility bills may be composed of components: water bill, heating bill, electricity bill, and other utility bills. In contrast, an atomic item corresponds to an item that cannot be divided. For example, an atomic item may correspond to the amount of money that a user has in a single account and in a particular money market fund.

The financial data may correspond to cash flow (i.e., the amount of money flowing into and out of an account), inventory flow (i.e., the amount of raw materials and product transferring between accounts), or any other type of financial (e.g., accounting) flow. The interconnection shows the interrelationships between the financial data.

For explanatory purposes, the root financial map (106) is described as a hierarchy below. In one or more embodiments of the invention, the root financial map (106) includes a root node (108), one or more contributor financial maps (110a-110b), one or more expenditure financial maps (112p-112q), and one or more asset financial maps (114x-114y).

The root node (108) corresponds to the item in the financial data for which a user is interested. In one or more embodiments of the invention, the root financial map (106) is generated from the root node (108). In particular, the root financial map (106) shows how items in financial data contribute to and/or reduce from the root node (108). The root node (108) may correspond to a single item (e.g., an amount of cash in a specific account, amount of stock of a particular company owned, amount of a particular product at a warehouse, or any other such singular item) or to an aggregate item (e.g., total immediate cash available, net worth, monetary value of inventory at a warehouse, or any other such aggregate group of items).

The root node (108) is connected to one or more contributor financial maps (110a-110b). A contributor financial map corresponds to an interconnection of one or more contributor nodes (not shown). Contributor nodes represent items in the financial data that contribute, directly or indirectly, to the root node (108) (i.e., the item for which the user is interested). Each contributor financial map includes a root contributor node (not shown). A root contributor node directly contributes to the root node (108) in the root financial map (106). For example, if the root node (108) of the root financial map (106) corresponds to an amount of cash, then a root contributor node may correspond to a source of income that contributes to the cash, such as income from a job. The root contributor node may serve as a basis from which a contributor financial map (110a-110b) is generated.

In contrast to the contributor financial map (110a-110b), an expenditure financial map (112p-112q) corresponds to an interconnection of one or more expenditure nodes representing expenditure items. Specifically, each expenditure item in the financial data, directly or indirectly, reduces from the amount of the root node in accordance with one or more embodiments of the invention. Moreover, each expenditure financial map (112p-112q) includes a root expenditure node (not shown) that directly reduces the amount of the root node (108) in the root financial map (106). For example, if the root node (108) in the root financial map (106) corresponds to an amount of inventory in a warehouse, then the root expenditure node may correspond to an amount of inventory sent to a distributor. Similar to the root contributor node, the root expenditure node may serve as a basis for which an expenditure financial map (112p-112q) is generated.

An asset financial map (114x-114y) corresponds to one or more asset nodes that represent assets items in the financial data. Asset items have the potential to contribute to and reduce from the root node, either directly or indirectly. A root asset node (not shown) in the asset financial map (114x-114y) both contributes to and reduces from the root node (108) of the root financial map (106). Specifically, a root asset node is an asset to the root node (108). For example, if the root node (108) represents a total amount of cash, then an asset node may represent a stock that is both purchased and pays dividends.

The root contributor node(s), the root expenditure node(s), and the root asset node(s) may subsequently have nodes that contribute to, reduce from, or are assets to the node. For example, a root asset node corresponding to investments may be connected to an asset node representing retirement accounts and another asset item representing stocks owned. In the example, the root asset node may be considered as a root node in the asset financial map (114x-114y).

Furthermore, one or more contributor financial map(s) (110a-110b), one or more expenditure financial map(s) (112p-112q), and one or more asset financial map(s) (114x-114y) may be interrelated. Specifically, a node in one financial map may be connected to a node in a different financial map. More specifically, a node in the first financial map may represent a contributor, an expenditure, or an asset with respect to a node in a different financial map. Thus, the nodes in the two financial maps may be graphically connected. For example, an asset node representing stocks may contribute to an expenditure node representing taxes. In the example, if the stocks pay dividends, then taxes may be due on the dividends.

Continuing with the root financial map (106) of FIG. 1, the interconnection between the nodes in the root financial map (106) may be represented by one or more connectors (e.g., connector a-b (116a-116b), connectors p-q (118p-118q), connector x-y (120x-120y). Each connector represents how two items in the financial data are interrelated. For example, a root contributor node may have a connector, such as connector a (116a) or connector b (116b), that leads from the root contributor node to the root node (108). Similarly, a root expenditure node may have a connector, such as connector p (118p) or connector q (118q), that leads to the root expenditure node from the root node (108). Finally, a root asset node may have a bi-directional connector, such as connector x (120x) or connector y (120y) between the root asset node and the root node (108). As an alternative to bi-directional connectors, two connectors may be used for each asset items.

All or a subset of the connectors may have a process identifier. The process identifier denotes the relationship between two nodes in the root financial map. In particular, the process indicator indicates the process by which the two nodes are related. For example, a process indicator may indicate that inventory is sold by a root node representing inventory at a warehouse to an expenditure node representing inventory at a distributor. In another example, the processor indicator may indicate that when the asset depreciates, the asset is an expenditure.

The process indicator may be displayed as a process node interposed between two nodes in the graph or as text on the connector. The process by which two nodes are related may be denoted by the process indicator through the text or the display attributes of the node.

In particular, in one or more embodiments of the invention, each node (i.e., root node, contributor node, expenditure node, asset node, and/or process node) on the root financial map has display attributes. The display attributes specify how the node is displayed on the root financial map. For example, the display attributes may specify color, size, shape, font style of text in the node, etc. Further, in one or more embodiments of the invention, the display attributes may denote the type of node. Thus, a root node may be displayed differently (e.g., different color, size, shape, etc.) than a contributor node. In addition, a contributor node may be displayed differently than an expenditure node and an asset node.

In one or more embodiments of the invention, the settings for display attributes are configurable by a user. Specifically, a user may specify the display attributes for each type of node. Alternatively, default settings may be used.

In addition to display attributes, in one or more embodiments of the invention, each node includes a label on the node. The label identifies the item in the financial data for which the node relates. For example, the label may state total cash, expense, bills, inventory, etc. Further, in one or more embodiments of the invention, the label may also include an amount, monetary or otherwise.

Continuing with the root financial map, in one or more embodiments of the invention, the root financial map is dynamic. Specifically, a user may submit a request to view the details of a node in the root financial map. FIG. 2 shows a root financial map when details of a node are displayed in accordance with one or more embodiments of the invention. Specifically, FIG. 2 shows the detail view of an asset node (152) in asset y financial map (114y) when the asset node is selected.

As shown in FIG. 2, when the root financial map show a detail view (150), the original root financial map (106) may be lightened (i.e., grayed out) in the display (not shown) and a node showing details (154) is displayed. In one or more embodiments of the invention, the node showing details includes a label (158), identification of the components of the item that the node represents (e.g., component w (160a), component z (160b)), an amount associated with each component (e.g., amount w (162a), amount z (162b)), a total label and a total amount of the item (166).

In one or more embodiments of the invention, the label (158) identifies the node for which details are displayed (e.g., asset node (152)) and that the node shows details. Thus, an asset node may have a label asset node details (as shown in FIG. 2). The components (e.g. component w (160a), component z (160b)) listed in the node showing details (154) identify items in the financial data which are components of the node. In particular, as discussed above, a node in the original root financial map (106) may correspond to an aggregate item in the financial data. An aggregate item has components corresponding to other items in the financial data. For example, an aggregate item corresponding to utility bills may be composed of components: water bill, heating bill, electricity bill, and/or other commonly known utilities.

As shown in FIG. 2, the node showing details (154) shows a list of the components (e.g., component w (160a), component z (160b)) of the aggregate item. As an example, in FIG. 2, the aggregate item is an asset item that is represented by an asset node (152). If the asset item corresponds to a house loan, then the components (e.g., component w (160a), component z (160b)) of the house loan that are listed on the node showing details (154) may include interest, principle, number of years in loan, or other loan information.

Each component (e.g., component w (160a), component z (160b)) is associated with an amount (e.g., amount w (162a), amount z (162b)). The amount (e.g., amount w (162a), amount z (162b)) corresponds to the amount that the component contributes to the aggregate item. In one or more embodiments of the invention, the amount is configured to receive modifications. A modification corresponds to a changed amount and addition/removal of an item/component performed by a user. In particular, a user may modify the amount (e.g., amount w (162a), amount z (162b)) with hypothetical data (i.e., data that is not correct in actuality) in order to simulate, analyze, and optimize possible future transactions. For example, a user may modify the monthly payment of a loan to understand how the modified monthly payment affects cash flow. Once a user submits hypothetical data, the modifications may be propagated to the original root financial map.

In addition to components (e.g., component w (160a), component z (160b)) with associated amounts (e.g., amount w (162a), amount z (162b)), a total label (164) and a total amount (166) is listed if applicable in accordance with one or more embodiments of the invention. The total amount (166) corresponds to a total amount of the aggregate item. For example, the total amount may reflect the total amount of all bills, the total amount of inventory, etc. In one or more embodiments of the invention, the total amount (166) may also be modified by the user. In one or more embodiments of the invention, a user may switch between displaying the root financial map without details of any node and the root financial map with details of a node.

Returning to FIG. 1, an input unit (102) includes functionality to receive input from a user. For example, the input unit (102) may correspond to a mouse, a stylus, keyboard, microphone, etc. Further, the input unit (102) may correspond to the same physical device as the display device (100). For example the input unit (102) and the display device (100) may correspond to a touch screen which includes functionality to receive and output data.

Interposed between the display device (100) and the input unit (102) is a financial application (104). The financial application (104) includes functionality to receive financial data and generate a root financial map (106). The financial application (104) may receive the financial data directly from a user and/or may receive financial data from another financial application. The financial application includes a financial data repository (122), a listener (124), and a map engine (126). Each of these components is described below.

A financial data repository (122) corresponds to a storage unit (e.g., spreadsheet, database, file, etc.) for financial data. A listener (124) includes functionality to detect input from a user, identify the type of input, and format the input for the map engine (126). For example, in one or more embodiments of the invention, a user may select a node to show details by clicking on the node with a mouse or touching the node in the case of a touch screen. The listener (124) includes functionality to detect that a node is selected, identify the node that is selected by the position of the pointer or the touch on the display device, and transmit the information to the map engine (126).

A map engine (126) includes functionality to generate the root financial map and update the root financial map. In one or more embodiments of the invention, the map engine (126) includes business logic (not shown) and a graphical user interface (not shown). The business logic includes functionality to detect the relationships between items in the financial data, aggregate items, create an internal representation of the financial data, update the internal representation when hypothetical data is received, etc. The graphical user interface specifies how to display and how the user interacts with the financial data. Specifically, the graphical user interface specifies the display attributes of each node in the root financial map, the type of connectors used, how the user selects a node for details, how a user submits hypothetical data, etc.

In the description below, the phrase "financial map" is used to refer to the "root financial map" unless otherwise specified. For example, the "contributor financial map", "expenditure financial map", and "asset financial map" is used to refer to parts of the complete "financial map." Further, the word "node" in the description below may correspond to any one of a "root node", "contributor node", "expenditure node", or "asset node" unless otherwise explicitly specified.

Figure 3:
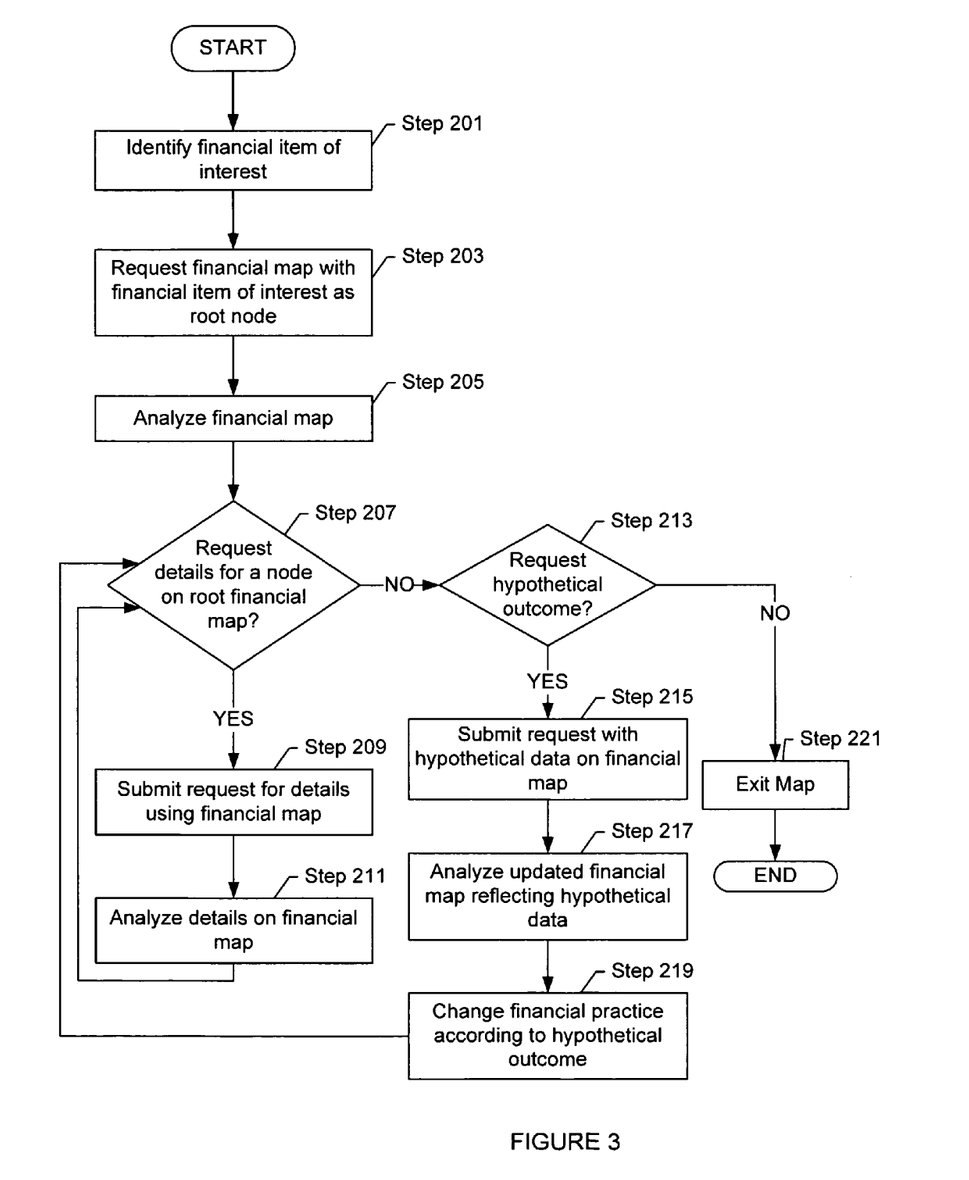
FIGS. 3-5 show flowcharts of a method for mapping user financial data in accordance with one or more embodiments of the invention.
Figure 4:
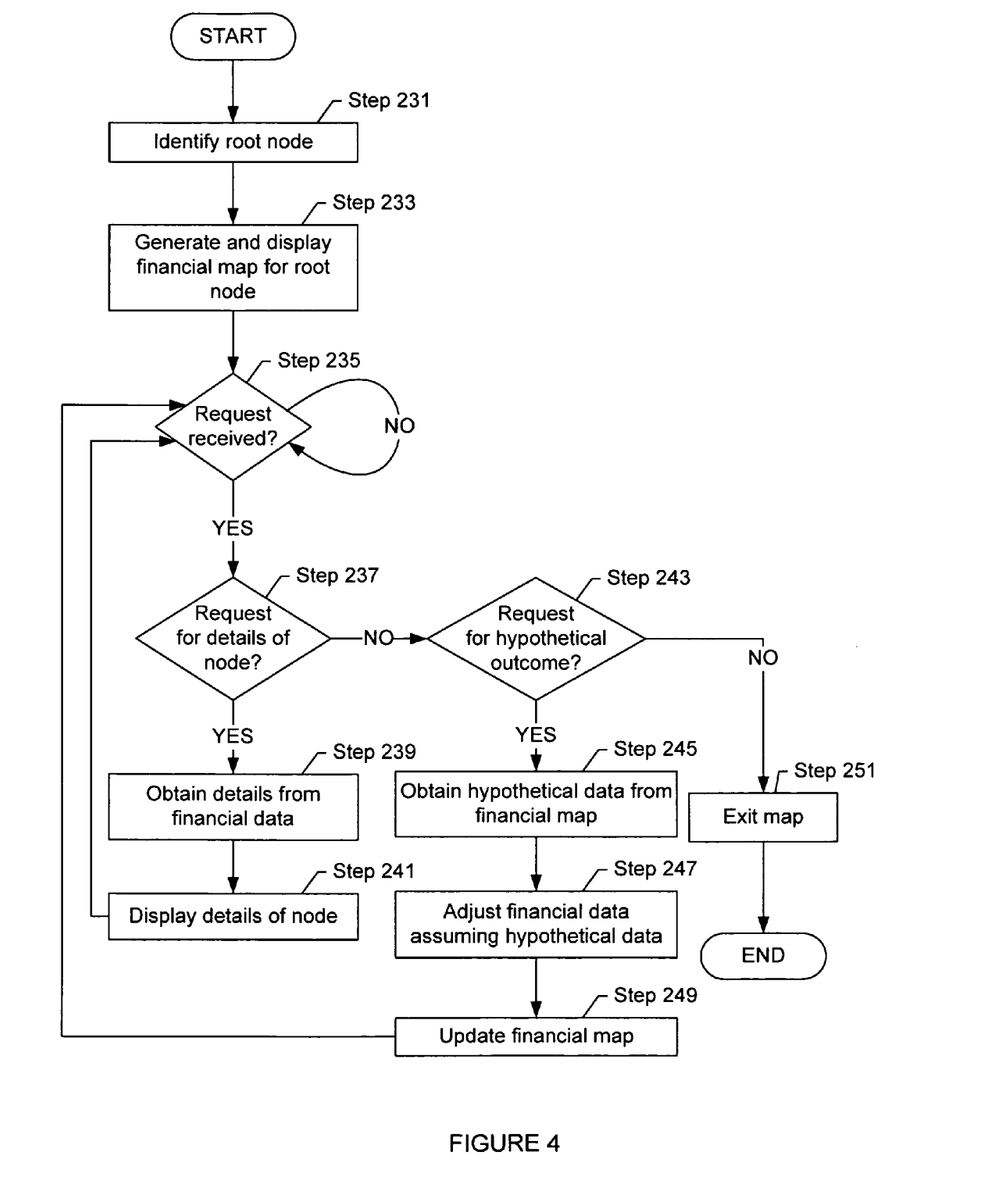
Figure 5:
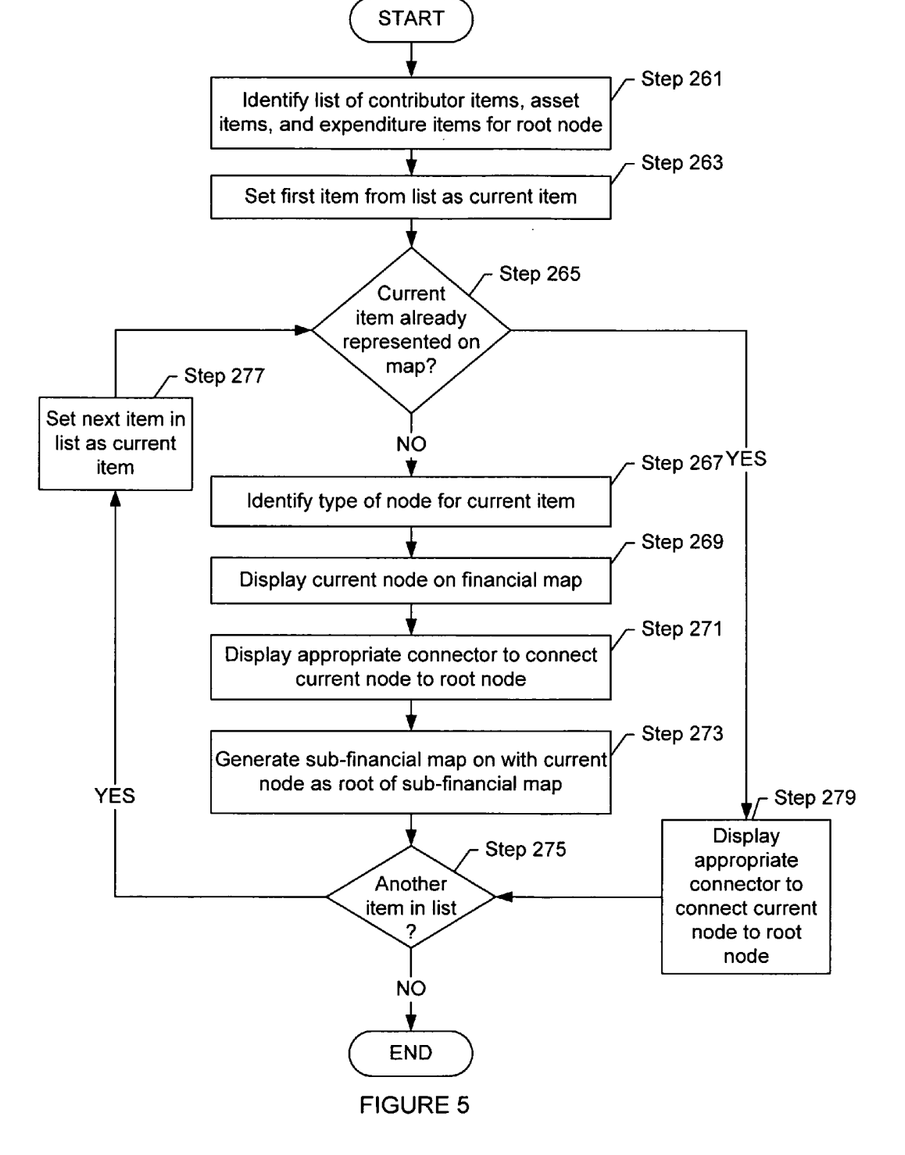

FIGS. 3-5 show flowcharts of a method for mapping user financial data in accordance with one or more embodiments of the invention. FIG. 3 shows a flowchart of a method for analyzing financial data in accordance with one or more embodiments of the invention. Initially, a financial item of interest is identified (Step 201). Specifically, a user identifies the financial item in which the user is interested. For example, the user may desire a financial map representing cash flow through an individual's monetary accounts. Accordingly, the user may determine that the financial item of interest is a monetary amount of cash available in all of the individual's monetary accounts. The user may determine the financial item of interest while reviewing financial data in a financial application.

Next, a financial map is requested with the financial item of interest as the root node of the financial map (Step 203). The financial map may be requested by a user selecting the financial item of interest and submitting a request using a menu of options in a financial application for the financial map. When the financial map is requested, a financial map is generated with the root node representing the item of the interest.

Accordingly, the financial map is analyzed (Step 205). Specifically, a user may use the financial map to understand how financial data is interrelated. More specifically, the financial map provides a visualization of financial data. The visualization allows the user to interact with the financial data and understand the interrelationships within financial data.

While analyzing the financial map, a determination is made whether to request details for a node on the financial map (Step 207). Specifically, a user may desire to view the financial data corresponding to a node in the financial map in more detail. If requesting details is desired, a request is submitted for details of a node using the financial map (Step 209). In particular, a user may submit a request that identifies a node (e.g., asset node, root node, etc.). Submitting a request may involve the user clicking on the node in the financial map, speaking the name of the label of a node in the financial map, or performing any other technique for specifying a node.

After the request is submitted, details of the node are displayed. Accordingly, the details of the node are analyzed (Step 211). Specifically, a user may review the details of the node and identify possible areas of improvement for the financial data.

After analyzing the details, the user may determine whether to request the detail of another node in the financial map (Step 207). If the user does not decide to request the details of a node in the financial map, then the user may decide to request a hypothetical outcome (Step 213). A hypothetical outcome corresponds to the resulting propagation of changes when hypothetical data is submitted to the financial map. In particular, the user may desire to know how the financial data may change if hypothetical data were used. For example, an hourly worker may desire to know how much cash would be available if the hourly worker worked two extra hours a day and did not invest as much. Accordingly, the hourly worker may use a cash flow map and adjust the hours in a node representing income and adjust the amount in a node representing investments.

Continuing with FIG. 3, if a hypothetical outcome is desired, then a request is submitted with hypothetical data on the financial map (Step 215). Specifically, a user may modify a number in the details of a node on financial map, remove the node from the financial map, change the value of the node on the financial map, etc. After the hypothetical data is submitted, then an updated financial map is generated. Specifically, the unaltered data in the financial map is changed so as to reflect the modification.

Thus, the updated financial map that reflects the hypothetical data may be analyzed (Step 217). Specifically, using the updated financial map, the user may determine whether adjusting financial transactions in real life would lead to improved performance. Further, the user may continue adjusting the financial data in the financial map to obtain the hypothetical outcome resulting from different modifications to the financial data.

After reviewing one or more hypothetical outcomes, the user may change a financial practice according to the hypothetical outcome (Step 219). Specifically, the user may use the financial map to determine which change(s) to financial practice(s) would optimize the user's ability to reach the user's goal. Then, the user may adjust the financial practices accordingly. Thus, if a user changes multiple amounts in the financial data, then the user may understand the resulting hypothetical outcome and the new interrelationships that may be formed.

Continuing with the previous example, suppose the hourly worker wanted to purchase a new car. The hourly worker may have several options, such as working two extra hours a day, investing less, spending less money on luxury products, decreasing the utility bill, or performing any combination thereof, to save the money for the new car. Accordingly, the user may analyze a financial map showing cash flow, select and modify a few amounts in the nodes on the financial map, and identify an optimal strategy to saving the money. For example, the hourly worker may determine using the financial map that working two extra hours would not cause a sufficient increase in wage to overcome the loss of personal time. Instead, the hourly worker may decide to decrease the amount spent on luxury goods and decrease the utility bill by reducing the amount of air conditioning used.

If a hypothetical outcome is not desired, or once the user has decided how to optimize a financial practice, the user may exit the financial map (Step 221) and implement the changes in the financial practice.

FIG. 4 shows a flowchart of a method for displaying and updating a financial map to show financial data. Initially, a root node is identified (Step 231). Specifically, the financial application receives a submission from the user that reflects the item of interest. Next, a financial map is generated and displayed for the root node (Step 233). Generating and displaying the financial map may be performed simultaneously or as separate steps in which an internal representation is first generated and the internal representation is displayed. Further, generating and displaying the financial map is described below and in FIG. 5.

Continuing with FIG. 4, once the financial map is displayed, a determination is made whether a request is received (Step 235). Specifically, a user viewing the financial map may determine whether to review the details of a node, request a hypothetical outcome, or exit the map.

If a request is not received, then the financial application may wait until a request is received. Alternatively, when a request is received, then a determination is made whether the request is for the details of a node (Step 237). Specifically, a listener may detect that the user has requested details of a node and the node in which the details are requested. If the request is for the details of a node, then the details are obtained from the financial data (Step 239). At this stage, the financial data repository may be accessed to determine the components of the item that the node represents. Further, the amounts associated with each component may also be accessed.

Next, the details of the node are displayed (Step 241). Displaying the details of the node may involve creating a new node showing the details and visually linking the new node with the node for which details are requested, moving various nodes in the financial map to create an area for the new node, changing the font color or brightness of the original financial map to emphasize the node showing the details, creating a window that lists the details of the node, etc. Once the details of the node are displayed, then the user views the details and the financial application waits until another request is received (Step 237).

If the request is not for the details of the node, then the request may be for a hypothetical outcome (i.e., a hypothetical outcome request). Accordingly, a determination is made whether the request is for a hypothetical outcome (Step 245). If the request is a hypothetical outcome request, then the financial application obtains hypothetical data from the financial map. Specifically, modifications to the financial data are detected and transmitted to be processed. Using the hypothetical data, the financial data is adjusted with the assumption that the hypothetical data is actual data. Adjusting the financial data is performed so as to not be a permanent change in accordance with one or more embodiments of the invention. Specifically, techniques known in the art may be used to maintain the original financial data. Further, adjusting the financial data may involve recalculating calculated data. For example, the amount of cash transferred or available may be recalculated using the hypothetical data.

Next the financial map is updated (Step 249). Updating the financial map may involve regenerating and displaying all or a part of the financial map. Displaying an updated financial map may include determining which portions of the financial map have changed and emphasizing the portions that have changed. Specifically, shading, font color, shapes, etc may be used to show the revised portion of the financial map. Alternatively, certain adjustments to the financial data may not impact the financial map. In such scenario, a revised financial map may not need to be regenerated or displayed. Once the revised financial map is displayed, then the user reviews the revised financial map and the financial application may wait for another request (Step 235).

When the user has completed reviewing and analyzing the financial map, then the user may exit the financial map (Step 251). When exiting the financial map, the user may choose to save the hypothetical data for future reference. In such scenario, the hypothetical data may be saved in a manner so as to maintain the original financial data in accordance with one or more embodiments of the invention.

FIG. 5 shows a flowchart of a method for generating and displaying a financial map in accordance with one or more embodiments of the invention. Those skilled in the art having benefit of the disclosure will appreciate that multiple different algorithms exist that may be used to generate the financial map. FIG. 5 is an example of one such method which employs recursion to generate the financial map. As a pre-processing step to FIG. 5, a root node that represents the item of interest to the user is placed on the map in accordance with one or more embodiments of the invention.

Next, a list of contributor items, asset items, and expenditure items are obtained for the root node (Step 261). Specifically, each item in the list is directly related to the root node. The first item in the list may be set as the current item (Step 263).

After setting a current item, a determination is made whether the current item is already on the map (Step 265). Determining whether the current item is on the map may involve searching items on the financial map to detect whether the current item exists. If the current item is not on the map, then the type of node for the current item is identified (Step 267). For example, if the current item contributes to the root node, then the type of node for the current item is a contributor node. Accordingly, the display attributes for the type of node may be accessed.

Next, the current node (i.e., a node representing the current item) is displayed on the financial map (Step 269). In addition to displaying the node, an appropriate connector is displayed to connect the current node to the root node (Step 271). For example, the relationship between the current node and the root node is identified. A connector that represents the relationship is added and placed on the financial map to graphically connect the current node and the root node. Further, a process identifier may be added in the form of a process node or as text to further detail the relationship between the current node and the root node. Displaying the current node and the connector may involve resizing the financial map to create room for the current node, rerouting one or more connectors on the financial map, and moving nodes.

Once the current node and the appropriate connector is displayed, then a sub-financial map (i.e., contributor financial map, expenditure financial map, asset financial map) is generated with the current node as the root of the sub-financial map (Step 273). In one or more embodiments of the invention, the Step described in FIG. 5 is performed recursively with the assumption that the current node is the root. The sub-financial map is displayed on the financial map.

Once the sub-financial map is generated, then a determination is made whether another item in the list exists (Step 275). If another item in the list exists, then the next item is set as the current item (Step 277) and the process repeats.

If, alternatively, the current item is already represented on the map, then the appropriate connector is displayed on the financial map to connect the current node to the root node (Step 279). As previously discussed, displaying the appropriate connector may involve rerouting connectors already on the map, adding a process identifier, etc. Once the appropriate connector is added to the map, then a determination is made whether another item in the list exists (Step 275). When the list is empty, then the financial map or sub-financial map is complete.

Figure 6A:
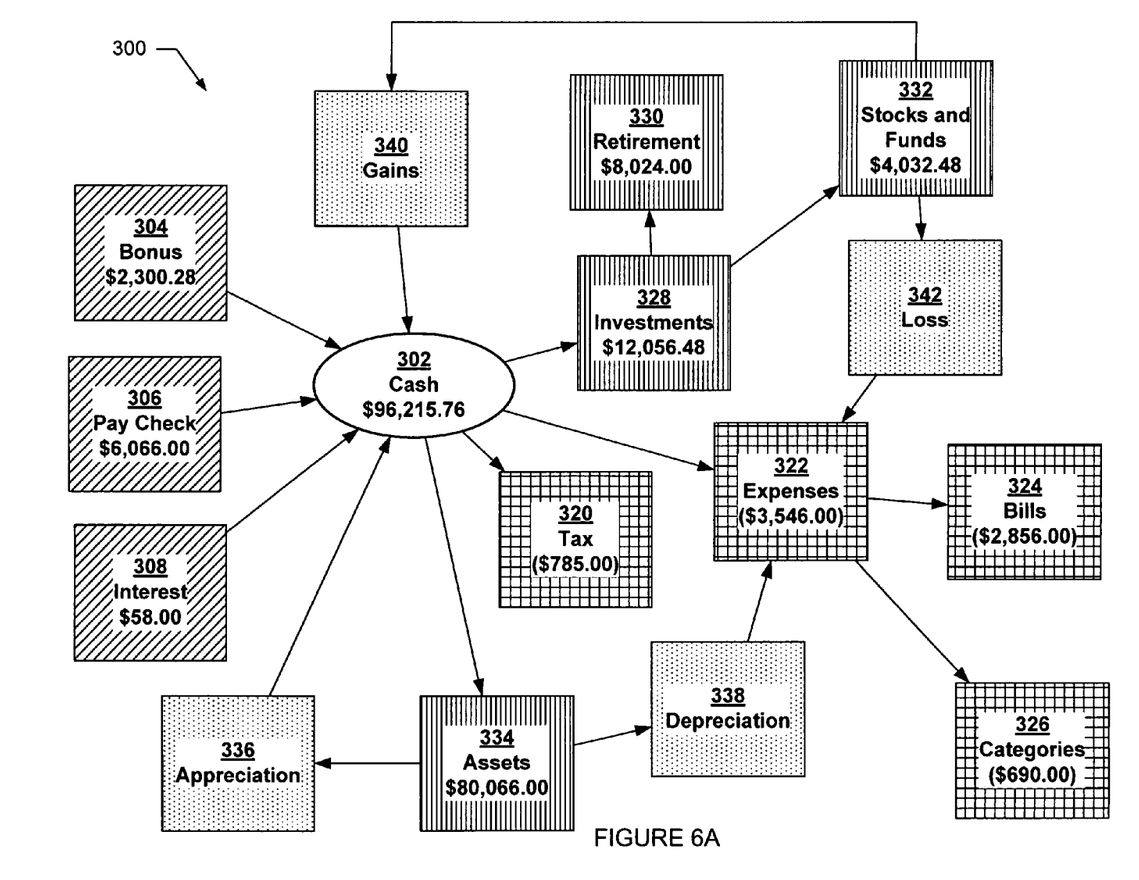
FIGS. 6A-6B show an example for mapping a user's financial data in accordance with one or more embodiments of the invention.
Figure 6B:
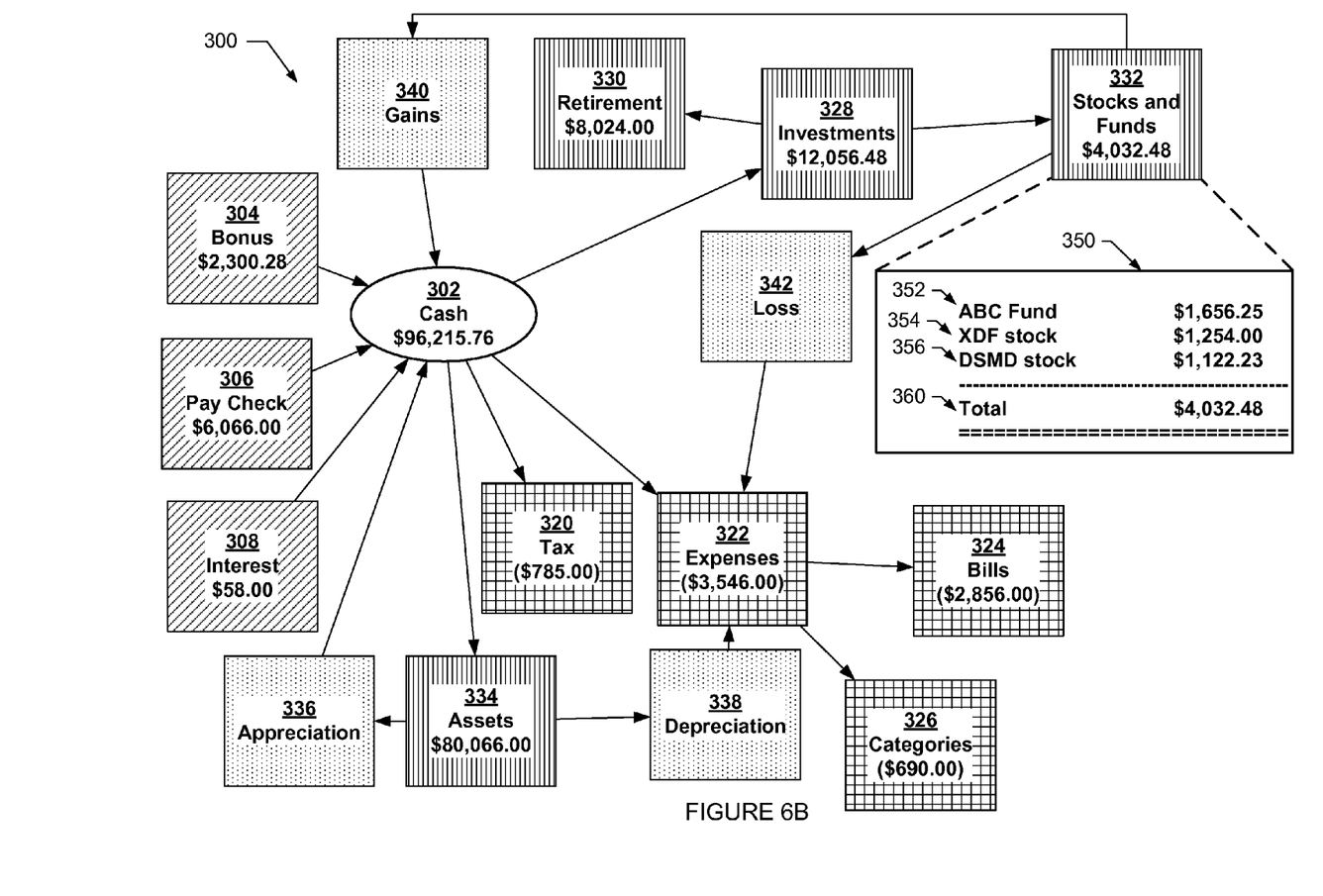

FIGS. 6A-6B show an example for mapping a user's financial data in accordance with one or embodiments of the invention. Specifically, FIG. 6A shows a financial map (300) in accordance with one or more embodiments of the invention. For the example shown in FIG. 6A, consider the scenario in which a user requests a cash flow financial map (300) with the root item as the total amount of cash the user has available.

Further, consider the case in which the display attributes are set as follows:

1. The root node is a labeled oval without shading.
2. The contributor nodes are labeled rectangles with diagonal line shading.
3. The expenditure nodes are labeled rectangles with crossed line shading.
4. The asset nodes are labeled rectangles with vertical line shading.
5. The process identifiers are labeled rectangles with polka dot shading.

As shown in FIG. 6A, for the financial data that the user requests, the contributor items to the cash (as shown in the cash node (302) are bonus, pay check, and interest (as shown in bonus node (304), pay check node (306), and interest node (308), respectively, on the financial map). Further, as shown on the example financial map (300) of FIG. 6A, each the label of each node (e.g., bonus node (304), pay check node (306), interest node (308)) also shows the amount that each item contributes in accordance with one or more embodiments of the invention. For example, by merely viewing the label, the user can tell that the bonus contributes $2,300.28, the pay check contributes $6,066.00 and the interest contributes $58.00 to the total of $92,215.76 amount of cash.

The example financial map (300) of FIG. 6A shows a node representing a tax item (320) and a node representing expenses item (322) to indicate that taxes and expenses are direct expenditures of the cash (302). Further, the amount that the tax reduces from the cash is $785.00 as shown in the label of the tax node (320). Further, the amount that the expenses reduce from the cash is $3,546.00 as shown in the label of the expenses node (328). The example financial map further shows expenses to include bills and categories of expenses (shown in the node representing bills (324) and the node representing categories of expenses (326), respectively). In one or more embodiments of the invention, the node representing expenses (322), the node representing bills (324) and the node representing categories (326) may be considered together as a distinct expenditure financial map. Also the node representing taxes (320) may be considered as a distinct expenditure financial map.

Finally, as shown in the financial map (300), the assets which may act as both contributors and expenditures to the cash include assets and investments as denoted by the nodes representing assets (334) and the node representing investments (328). By reviewing the example financial map (300), using the process identifiers (e.g., appreciation (336), depreciation (338)), the user can understand that assets (334) that depreciate becomes an expenses (322) as shown in the process identifier for depreciation (338) and adjacent connectors. Conversely, assets that appreciate increase the amount of cash (302) as shown in the process identifier for appreciation (336) and adjacent connectors.

Also by reviewing the financial map, a user may determine that investments (328) may be divided into two categories: retirement (330) and stocks and funds (332). The financial map (300) shows that retirement (330) has $8,024.00 in the account while stocks and funds include $4,032.48 in the account. Further, stocks and funds that are sold at a loss as indicated by process identifier (342) contribute to expenses while stocks and funds that are sold as gain as indicated by process identifier (340) contribute to cash.

Consider the scenario in which after review the financial map (300), the user is interested in obtaining more details on the stocks and funds. Accordingly, the user clicks on the node representing stocks and funds (322) to request details of stocks and funds. FIG. 6B shows the exampled displayed financial map showing details in accordance with one or more embodiments of the invention.

As shown in the example FIG. 6B, the nodes in the original displayed financial map may be moved and the brightness reduced to emphasize the node showing details (350) of the stocks and funds. By reviewing the node showing details, a user may determine that the components of the stocks and funds include $1,656.25 invested in ABC fund (352), $1,254.00 invested in XDF stock (354), and $1,122.23 invested in DSMD stock (356). ("ABC", "XDF", "DSMD", and "VPM" are whimsical symbolic names for hypothetical financial institutions). Further, the user may determine that the total amount invested is $4,032.48 as shown in the stocks and funds node (332) and shown in the total (360).

The user may change the amounts of any of the components by changing the value of the amount on the node showing details (350). Specifically, if a user wanted to determine cash available for changing the amount to a hypothetical amount, then the user may select the amount on the node showing details (350) and change the amount. For example, the user may want to identify how changing the amount the user invests to $5,000.00 in DSMD stock instead of the current $1,122.23 affects cash flow. Accordingly, the user makes the change in the node showing details (350). If DSMD operates at a loss in value, then the amount of the change may affect the amount of expenses. Further, the total amount of cash available may have to compensate for the added investments. Accordingly, after submitting the change, a modified financial map may be displayed to show changes made to the financial data.

Figure 7:
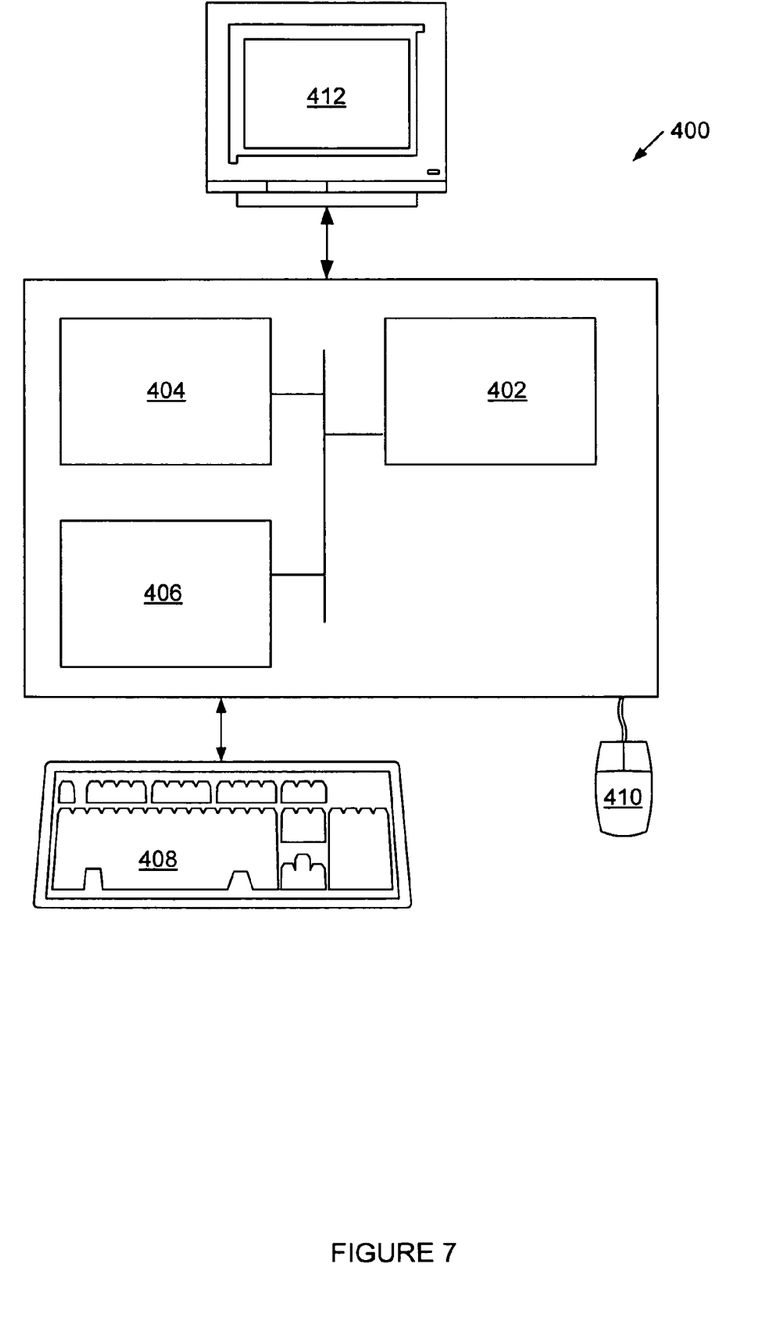
FIG. 7 shows a computer system in accordance with one or more embodiments of the invention.

The invention may be implemented on virtually any type of computer regardless of the platform being used. For example, as shown in FIG. 7, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., map engine, display device, listener, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   a processor;
   an input device;
   a display device; and
   software instructions executable by the processor to display a root financial map on the display device, the root financial map comprising:
      a root node;
      a contributor financial map graphically connected to the root node by a first connector line and comprising a contributor node;
      an expenditure financial map graphically connected to the root node by a second connector line and comprising an expenditure node;
      an asset financial map graphically connected to the root node by a third connector line and comprising an asset node; and
      a process node graphically connected to the asset node by a fourth connector line and graphically connected to the root node by a fifth connector line, wherein the process node indicates a process by which the asset node and the root node are related,
      wherein the root financial map conveys financial data,
      wherein the root financial map is configured with functionality, upon a selection from a user, to display a detailed view of a selected node selected from a group consisting of the contributor node, the asset node, and the expenditure node, wherein the detailed view comprises a list of components of the selected node and a total, wherein the list of components comprises a description and a monetary amount for each component in the list of components,
      wherein the selected node receives hypothetical data resulting from the user modifying the root financial map by using the input device, wherein the hypothetical data comprises a modification of the monetary amount of a component in the list of components, and
      wherein the root financial map is updated based on the hypothetical data.

2. The computer system of claim 1, wherein the expenditure node and the contributor node each comprise a label identifying an item in the financial data.

3. The computer system of claim 1, wherein the root node comprises an amount of cash and the root financial map represents a cash flow.

4. The computer system of claim 1, wherein the root node comprises an amount of inventory and the root financial map represents an inventory flow.

5. The computer system of claim 1, wherein each connector line denotes a relationship in the financial data.

6. The computer system of claim 1, wherein the contributor node is displayed differently than the expenditure node.

7. A method for displaying financial data comprising:
   identifying, using a processor, a root node of the financial data;
   displaying, on a display device, a root financial map for the root node,
      wherein the root financial map conveys the financial data,
      wherein the root financial map comprises the root node, an expenditure node graphically connected to the root node by a first connector line, a contributor node graphically connected to the root node by a second connector line, an asset node graphically connected to the root node by a third connector line, and a process node graphically connected to the asset node by a fourth connector line and graphically connected to the root node by a fifth connector line, and
      wherein the process node indicates a process by which the asset node and the root node are related;
   receiving a selection from a user to display a detailed view of a selected node selected from a group consisting of the contributor node, the asset node, and the expenditure node;
   displaying, in response to receiving the selection, a detailed view of the selected node wherein the detailed view comprises a list of components of the selected node and a total, wherein the list of components comprises a description and a monetary amount for each component in the list of components;
   receiving a hypothetical outcome request resulting from the user modifying the financial data on the root financial map with hypothetical data, wherein the hypothetical data comprises a modification of the monetary amount of a component in the list of components;
   updating, using the processor, the root financial map to reflect a hypothetical outcome resulting from the hypothetical data to generate an updated financial map; and
   displaying, on the display device, the updated financial map.

8. The method of claim 7, wherein the contributor node is displayed differently than the expenditure node in the root financial map.

9. The method of claim 7, wherein the root financial map represents one selected from a group consisting of a cash flow and an inventory flow.

10. A computer readable storage medium comprising computer readable program code embodied therein, the program code executable by a processor for causing a computer system to:
    identify a root node of financial data;
    display a root financial map for the root node,
       wherein the root financial map conveys the financial data,
       wherein the root financial map comprises the root node, an expenditure node graphically connected to the root node by a first connector line, a contributor node graphically connected to the root node by a second connector line, an asset node graphically connected to the root node by a third connector line, and a process node graphically connected to the asset node by a fourth connector line and graphically connected to the root node by a fifth connector line, and
       wherein the process node indicates a process by which the asset node and the root node are related;

receive a selection from a user to display a detailed view of a selected node selected from a group consisting of the contributor node, the asset node, and the expenditure node;

display, in response to receiving the selection, a detailed view of the selected node wherein the detailed view comprises a list of components of the selected node and a total, wherein the list of components comprises a description and a monetary amount for each component in the list of components;

receive a hypothetical outcome request by the user modifying the financial data on the root financial map with hypothetical data, wherein the hypothetical data comprises a modification of the monetary amount of a component in the list of components;

update the root financial map to reflect a hypothetical outcome resulting from the hypothetical data to generate an updated financial map; and display the updated financial map.

11. The computer readable storage medium of claim 10, wherein the contributor node is displayed differently than the expenditure node in the root financial map.

12. The computer readable storage medium of claim 10, wherein the root financial map represents one selected from a group consisting of a cash flow and an inventory flow.

13. A system for displaying financial data comprising:
a processor;
an input device;
software instructions executable by the processor for a map engine configured to:
identify a root node of financial data;
generate a root financial map for the root node,
wherein the root financial map conveys the financial data,
wherein the root financial map comprises the root node, an expenditure node graphically connected to the root node by a first connector line, a contributor node graphically connected to the root node by a second connector line, an asset node graphically connected to the root node by a third connector line, and a process node graphically connected to the asset node by a fourth connector line and graphically connected to the root node by a fifth connector line, and
wherein the process node indicates a process by which the asset node and the root node are related; and
update a root financial map to reflect a hypothetical outcome resulting from hypothetical data to generate an updated financial map;
software instructions executable by the processor for a listener connected to the map engine and configured to:
receive a selection from a user to display a detailed view of a selected node selected from a group consisting of the contributor node, the asset node, and the expenditure node;
generate the detailed view comprising a list of components of the selected node and a total, wherein the list of components comprises a description and a monetary amount for each component in the list of components; and
receive a hypothetical outcome request by the user modifying the financial data on the root financial map with hypothetical data using the input device, wherein the hypothetical data comprises a modification of the monetary amount of a component in the list of components; and a display device configured to:
display the root financial map;
display the detailed view; and
display the updated financial map.

14. The system of claim 13, wherein the root financial map represents one selected from a group consisting of a cash flow and an inventory flow.

15. A method for analyzing financial data comprising:
submitting, using a processor, a request identifying a root node;
analyzing a root financial map displayed on a display device,
wherein the root financial map conveys the financial data,
wherein the root financial map comprises the root node, an expenditure node graphically connected to the root node by a first connector line, a contributor node graphically connected to the root node by a second connector line, an asset node graphically connected to the root node by a third connector line, and a process node graphically connected to the asset node by a fourth connector line and graphically connected to the root node by a fifth connector line, and
wherein the process node indicates a process by which the asset node and the root node are related;
selecting a node for displaying a detailed view, wherein the node is selected from a group consisting of the contributor node, the asset node, and the expenditure node;
viewing, in response to the selecting, a detailed view of the node wherein the detailed view comprises a list of components of the node and a total, wherein the list of components comprises a description and a monetary amount for each component in the list of components;
modifying the financial data on the root financial map with hypothetical data, wherein the hypothetical data comprises modifying the monetary amount of a component in the list of components;
analyzing an updated root financial map displayed on the display device, wherein the updated root financial map conveys a hypothetical outcome resulting from the hypothetical data; and
changing a financial practice according to the hypothetical outcome.

16. The method of claim 15, wherein the contributor node is displayed differently than the expenditure node on the root financial map.

17. The method of claim 15, wherein the root financial map represents one selected from a group consisting of a cash flow and an inventory flow.

* * * * *